April 28, 1931. P. M. WEGE Re. 18,057

DESK TOP

Original Filed Aug. 4, 1924

Inventor
Peter M. Wege
By Lyon & Lyon & Van Antwerp
Attorneys

Reissued Apr. 28, 1931

Re. 18,057

UNITED STATES PATENT OFFICE

PETER M. WEGE, OF GRAND RAPIDS, MICHIGAN, ASSIGNOR TO METAL OFFICE FURNITURE COMPANY, OF GRAND RAPIDS, MICHIGAN, A CORPORATION OF MICHIGAN

DESK TOP

Original No. 1,581,257, dated April 20, 1926, Serial No. 729,882, filed August 4, 1924. Application for reissue filed March 14, 1928. Serial No. 261,656.

Figure 1:
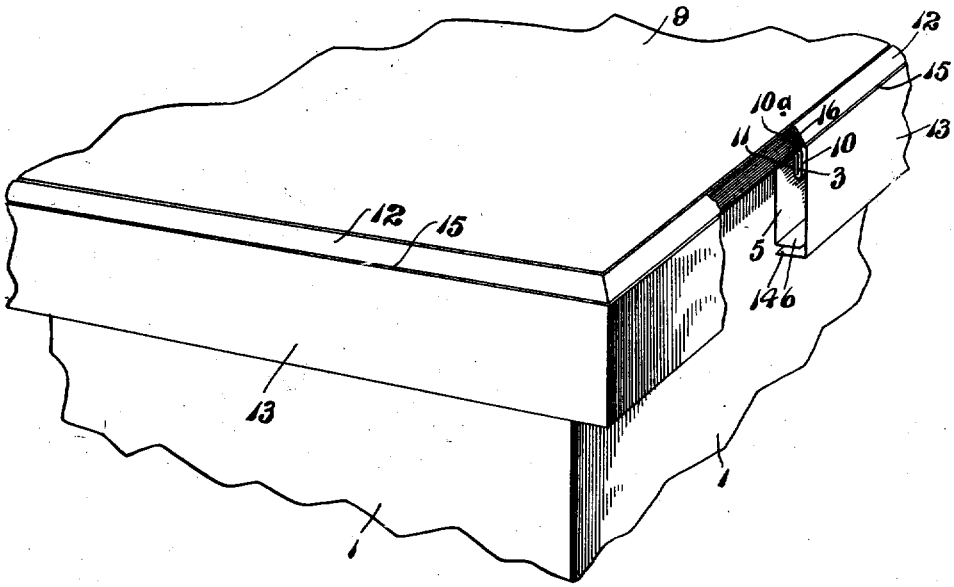

This invention relates to a desk construction and particularly to a desk top which may be used in the manufacture of sheet metal desks. It is desirable many times with desks of this character, that linoleum or similar wearing material be used to cover the top of the desk and it is an object and purpose of the present invention to produce a particularly simple, novel and effective construction wherein the desk top may be given a pleasing appearance, and a linoleum wearing member applied thereto and held in place surrounded by a metal border. A further object of the invention is to provide a novel construction, including separate parts, which may be interlocked and held together in their assembly in finishing the completed top and at the same time make a strong and durable, and attractive construction of desk top. Various other objects and purposes than those stated will appear as understanding of the invention is had from the following description taken in connection with the accompanying drawing, in which, Fig. 1 is a fragmentary perspective view showing a corner of the desk top with parts broken away to illustrate the assembly of the parts in the construction.

Figure 2:
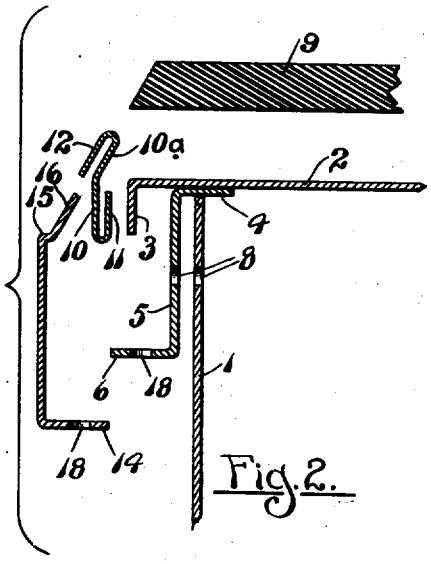
Figure 3:
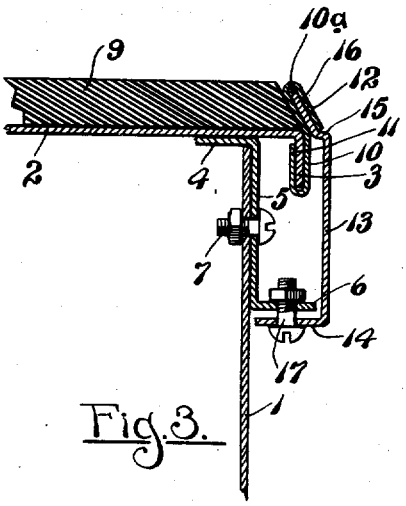

Fig. 2 is a fragmentary illustration, in vertical section, of the several parts used in constructing the desk top, said parts being separated from each other, and Fig. 3 is a fragmentary vertical section through one side or end of the desk top showing the parts in assembled relation.

Like reference characters refer to like parts in the different figures of the drawing.

The desk pedestal may be made in any desired or well known manner having vertical sides and ends 1 of sheet metal over which a top plate 2, located horizontally, is adapted to be placed, extending over and projecting a short distance beyond the sides and ends of the pedestals, said top plate at its edges being formed with down turned flanges 3. Set in a short distance from the flanges 3 are Z-bars having upper inwardly extending flanges 4 which lie against the underside of the top plate 2 and are welded or otherwise permanently secured to the top plate. The vertical webs 5 of the Z-bars extend downwardly and outside of the sides and ends 1 of the desk pedestals and the lower flanges 6 are turned outwardly at right angles, projecting to points beyond the vertical planes of the flanges 3 of the top plate 2. The webs 5 of the Z-bar are secured to the sides and ends 1 of the pedestals by stove bolts 7 which pass through alined openings 8 made in said webs 5 and the sides and ends of the pedestals, as shown in Fig. 3, thus securing the top plate 2 in fixed relation to the desk pedestals.

An upper covering member 9 to present a top wearing surface for the desk is adapted to be placed on the top plate 2 and in practice is secured thereto by gluing. Preferably this cover member is of linoleum and has its edges cut inwardly at an angle to the vertical as shown. Around the top plate 2 a frame is positioned made of thinner gage sheet metal than the metal used for the desk pedestals and for the plate 2, each side and end of the frame including a longitudinal member having a vertical web 10, the upper portion of which is bent inwardly at the same angle that the sides and edges of the member 9 are cut as indicated at 10*a*. The web 10 at its lower end is turned back upon itself into substantially U-shape, providing an inner leg 11 which parallels the web 10 while at its upper edge the inwardly inclined section 10*a* is bent upon itself outwardly into, a second U-shaped portion with an outer leg 12 paralleling the section 10*a*. This frame is placed around the top plate 2 and the flanges 3 are received in the lower U-shaped portion seating between the legs 11 and the webs 10, as shown.

The top is completed by outer side and end border members of metal, each including a vertical section 13 at the lower edge of which a flange 14 is turned inwardly at right angles to pass below the lower flange 6 of the adjacent Z-bar. At the upper edge of the section 13 the metal is bent inwardly for a short distance to make a shoulder 15 and thence extended upwardly and inwardly to make a section 16 inclined at the same angle as the parts 12, 10*a* and the sides and edges of the linoleum 9 so that said sections 16 may be received in the U-shaped portions between the parts 12 and 10*a* with the lower edges of the legs 12 bearing against shoulders 15. Stove bolts 17 are passed upwardly through alined openings in the flanges 6 and 14 and by tightening the bolts the outside border members are forced upwardly forcing the intermediate border frame upwardly so that a tight engagement is made with the flanges 3 and the sections 16 are forced as far as possible into the upper U-shaped portions of the inner border frame member. This makes a very secure and tight connection and one that is very quickly and easily assembled and put together.

The construction described is rigid and by use of such construction a pleasing and attractive appearance may be provided as the sections 13 may be finished with one finish while the legs 12 may be of another finish or of a different metal so as to present a contrasting appearance. Preferably the edges of the linoleum 9 are cut inwardly at an angle, though the invention is not limited to such formation, and with the border frames and members also inwardly inclined at their upper portions the linoleum is held against disengagement even if its glue connection with the top plate 2 should become disrupted. The parts are all readily formed from sheet metal and can be manufactured at low cost and assembled by labor having no particular skill. The invention is practical and, as defined in the appended claims, is to be considered as comprehensive of all forms of structure coming within the scope of said claims.

I claim:

1. In a desk, a pedestal having vertical sheet metal walls, a top plate lying horizontally thereover, Z-bars located under the top plate having upper inwardly extending flanges secured to the underside of the said plate and the vertical webs lying outside of and against the walls of the pedestal, means detachably securing the said webs and pedestal walls together, said top plate at its edges being formed with down-turned flanges, an intermediate border member of sheet metal located at each side and end of the top plate, and formed at its lower portion with an inwardly and upwardly turned leg, forming a U into which the said flanges of the top plate enters, and at its upper end being formed with an outwardly and downwardly turned leg making a similar U-shaped construction, an outer border member of sheet metal located at each side and end of the top plate having a vertical portion received in said last mentioned U-shaped construction and formed at its lower portion with an inturned horizontal flange passing under and spaced a short distance from the lower outturned flange of the adjacent Z-bars, bolts passing through said Z-bars and outer border member flanges to draw them toward each other, and a linoleum wearing member located above the said top plate having its edges surrounded by the upper portions of said intermediate border members, substantially as described.

2. A construction containing the elements in combination defined in claim 1, said intermediate border members being bent inwardly at an angle to the vertical and the edges of the linoleum being cut at a corresponding angle, and the upper portions of the outer border members being likewise bent inwardly at a like angle, substantially as described.

3. A construction containing the elements in combination defined in claim 1, said outer border members at their upper portions being formed with a shoulder paralleling the upper edges thereof against which the lower edge of the outturned leg of the upper U-shaped construction bears, substantially as described.

4. In a desk, pedestals having sheet metal vertical walls, a sheet metal top plate connected to the pedestals and lying above the same, a two-part border member surrounding the top plate, the upper part of said border member having connection with said top plate, and extending above the upper side thereof, and the lower part of said border member engaging with the said upper part, means connecting the lower part of the border member with the pedestals adapted to force said lower part of the border member upwardly to make a tight interlocking connection of the parts, and linoleum located over the top plate within the upwardly extending portions of the upper part of the said border member, substantially as described.

5. In a desk, a top plate of rectangular form having down turned flanges at its edges, a Z-bar having an upper inwardly extending flange, a vertical web and a lower outwardly extending flange secured to the underside of the top plate parallel with each edge thereof, an intermediate border member surrounding the top plate, formed at its lower end with a U-shaped construction to interlock with said flanges of the top plate and at its upper portion with a similar U-shaped construction, an outer border member located below the intermediate border member having vertical portions, the upper edges of which are received in the upper U-shaped construction of the intermediate border member, and inwardly extending flanges passing under and spaced from the outwardly extending flanges of the Z-bars, and bolts passing from the flanges of said Z-bars and outer border member.

6. In combination a top plate, members connected to and depending from the top plate a short distance from the edges thereof and paralleling said edges, each of said members having an outwardly extending flange at its lower portion, an inner border member surrounding the top plate, extending above the same and interlocked therewith, an outer border member surrounding the top plate having vertical portions interlocked with the inner border member and at its lower part formed with in-turned flanges passing below and spaced from the outwardly extending flanges of said first members, and means passing through said flanges of said members and the outer border member for drawing the same toward each other, substantially as described.

7. A top for furniture comprising, a sheet metal top plate, an upper border member surrounding the top plate and extending partly above the same, said top plate and upper border member having interlocking portions, linoleum placed above the top plate within the upwardly projecting portions of said upper border member, a lower border member engaging with said upper border member, and clamping means for detachably connecting the lower border member with the top plate.

8. A top for furniture comprising, a sheet metal top plate, an upper border member surrounding and connected to the top plate and extending above the upper side thereof, a lower border member engaging with the said upper border member, means connecting the lower border member with said top plate and adapted to force it upwardly to make a tight interlocking connection of the parts and linoleum located over the top plate within the upwardly extending portions of the upper border member.

9. A top for furniture comprising, a sheet metal top plate, an upper border member surrounding the top plate and extending partly above the same, linoleum placed above the top plate within the upwardly projecting portions of said upper border member and a lower border member engaging with said upper border member and means connecting the lower border member with said top plate and adapted to force it upwardly into engagement with said upper border member.

10. A top for furniture comprising, a sheet metal top plate member, an upper border member surrounding and connected to the top plate member and extended above the upper side thereof, a lower border member engaging with said upper border member, means connecting the lower border member with said top plate member and adapted to force said lower border member upwardly to make a tight connection of the member and linoleum located over the top plate member within the upwardly extending portions of the upper border member.

In testimony whereof I affix my signature.

PETER M. WEGE.